US006954139B2

(12) United States Patent
Ueda et al.

(10) Patent No.: US 6,954,139 B2
(45) Date of Patent: Oct. 11, 2005

(54) CONTACT DETECTING DEVICE

(75) Inventors: Shigeki Ueda, Nara (JP); Hiroyuki Ogino, Nara (JP); Shuji Yahagi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 40 days.

(21) Appl. No.: 10/628,667

(22) Filed: Jul. 29, 2003

(65) Prior Publication Data

US 2004/0085217 A1 May 6, 2004

(30) Foreign Application Priority Data

Jul. 30, 2002 (JP) ...................................... 2002-221004

(51) Int. Cl.[7] ................................................. B60Q 1/00

(52) U.S. Cl. ............. 340/436; 340/426.27; 340/426.28; 340/517; 340/523; 340/545.1; 340/686.1; 310/319; 310/330

(58) Field of Search ............................. 340/436, 686.1, 340/686.4, 540, 545.1, 426.27, 426.28, 517, 523, 438, 901, 903, 555, 556, 545.2, 545.4; 310/319, 326, 328, 330; 73/756; 318/257, 266

(56) References Cited

U.S. PATENT DOCUMENTS 4,943,757 A * 7/1990 Richter et al. .............. 318/468
5,051,672 A * 9/1991 Yaguchi ..................... 318/469
5,907,213 A * 5/1999 Oshima et al. ............. 310/328

FOREIGN PATENT DOCUMENTS

GB 2300732 * 11/1996 .......... E05F/15/00

* cited by examiner

*Primary Examiner*—Hung Nguyen
(74) *Attorney, Agent, or Firm*—Bacon & Thomas, PLLC

(57) ABSTRACT

A contact detecting device includes a flexible piezoelectric sensor of a cable shape, a resilient member including a hollow portion having a free end to allow the hollow portion to be opened, a sensor holding portion for holding therein the piezoelectric sensor. The hollow portion is provided with a support for maintaining a hollow state thereof.

16 Claims, 9 Drawing Sheets

CONTACT DETECTING DEVICE

FIELD OF THE INVENTION

The present invention relates to a contact detecting device for detecting a contact of an object for use in a self-propelled vehicle, a power window for an automobile, an electric slide door, a power sunroof, an automatic door of a building or the like.

BACKGROUND OF THE INVENTION

Various contact detecting devices have been used in the above-mentioned apparatuses, but they have certain problems in practical application, one of which is a mounting problem. Particularly, when a sensor therefor is in a form of a flexible cable, it is rather difficult to mount the sensor in a resilient member which serves to hold same in position. More specifically, in order to mount a long and flexible cable-shaped sensor in a sensor holding portion molded in the resilient member, the sensor holding portion needs to be enlarged to accommodate the sensor therein or a supplementary tool is required, rendering the mounting task tricky and cumbersome.

In order to solve the above problems, various mounting schemes have been developed. For instance, a contact detecting device of FIG. 17 for use in a power window for an automobile includes sensor 1 and hollow resilient member 2 for holding sensor 1. Resilient member 2 has sensor holding portion 3 for mounting therein sensor 1. Sensor 1 is held in resilient member 2 by opening resilient member 2 in a direction indicated by an arrow “A” and being inserted into sensor holding portion 3.

Such a contact detecting device is advantageous in that it facilitates the mounting of the sensor in the resilient member, but suffers from certain detection problems in some cases. In other words, such a contact detecting device can properly function when it is arranged in a straight manner. However, when it is arranged in a curved shape, the sensor holding portion of the hollow resilient member is deformed, resulting in a malfunction of the device.

SUMMARY OF THE INVENTION

It is, therefore, an object of the present invention to provide a contact detecting device capable of facilitating the mounting of a sensor in a resilient member and properly detecting contact even when it is in a curved arrangement.

In accordance with an embodiment of the present invention, there is provided a contact detecting device including:

a flexible piezoelectric sensor of a cable shape; and a resilient member for holding the piezoelectric sensor therein, the resilient member including a hollow portion, which has a free end to allow the hollow portion to be opened, and a sensor holding portion for mounting therein the piezoelectric sensor by way of opening the hollow portion, wherein the hollow portion is provided with a support for maintaining a hollow state thereof.

In accordance with another embodiment of the present invention, there is provided a contact detecting device including:

a flexible piezoelectric sensor of a cable shape;

a resilient member for holding the piezoelectric sensor, the resilient member including a hollow portion having a free end to allow the hollow portion to be opened;

a support for maintaining a hollow state of the hollow portion, the support being formed of an elastic body and filled in the hollow portion; and a sensor holding portion, provided in the support, for mounting therein the piezoelectric sensor.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF PREFERRED EMBODIMENTS

Figure 1:
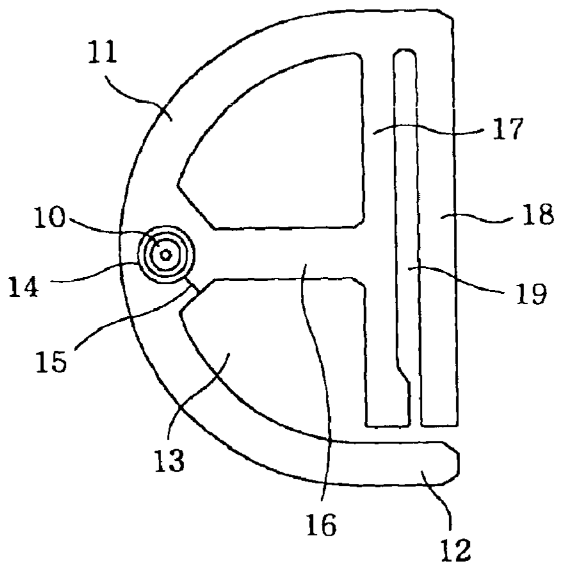
FIG. 1 is a transversal cross sectional view of a contact detecting device in accordance with a first preferred embodiment of the present invention.

Preferred embodiments of the present invention will now be described in detail with reference to the accompanying drawings, wherein like parts appearing FIGS. 1 to 16 are represented by like reference numerals.

(Embodiment 1)

Referring to FIGS. 1 to 6, there are shown a contact detecting device in accordance with a first preferred embodiment of the invention and exemplary applications thereof.

In FIG. 1, a reference numeral 10 represents a flexible piezoelectric sensor of a cable shape as will be described in detail later. A reference numeral 11 presents a resilient member for holding piezoelectric sensor 10, wherein the resilient member is made of, e.g., an expanded resin and a rubber material of a greater flexibility than that of piezoelectric sensor 10.

Figure 3:
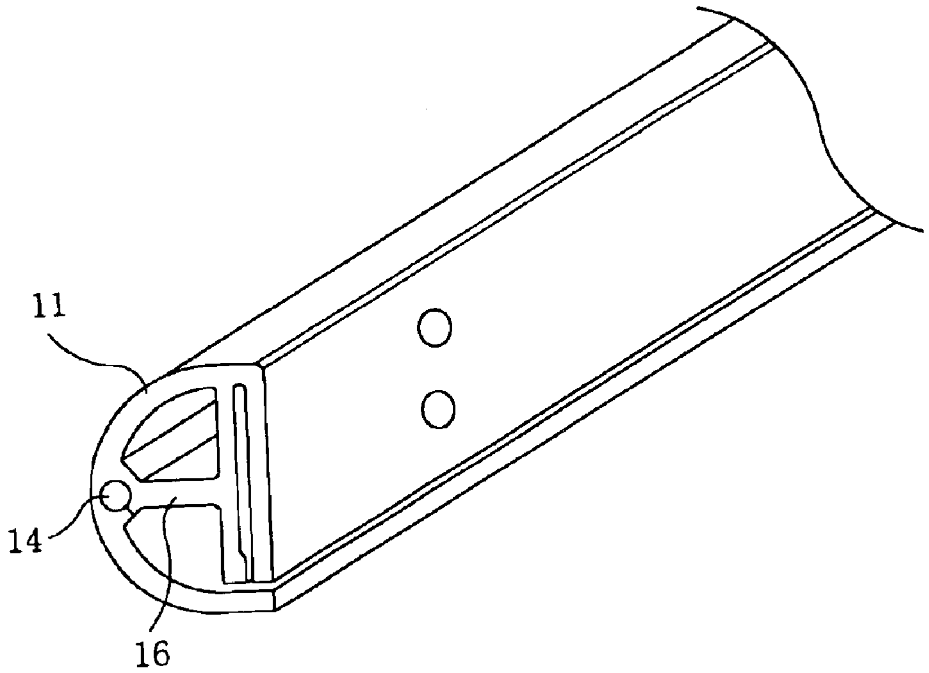
FIG. 3 illustrates a perspective view of the contact detecting device shown in FIG. 1.

Referring to FIG. 3, resilient member 11 has a shape of a thin and elongated tube with a semi-circular cross section. Further, resilient member 11 includes therein elongated cavity or hollow portion 13 having curved free end 12 at a part thereof for selectively opening hollow portion 13; and sensor holding portion 14 in which piezoelectric sensor 10 is mounted by opening hollow portion 13 by means of free end 12 and is held. Sensor holding portion 14 is provided in resilient member 11 at a substantially central portion of a round region thereof. Between sensor holding portion 14 and hollow portion 13 is provided cut region 15 extending from sensor holding portion 14 in a downward and rightward oblique direction when viewed from FIG. 1. Cut region 15 is opened while hollow portion 13 is opened.

Hollow portion 13 of resilient member 11 has support 16 for maintaining a hollow state of hollow portion 13. Support 16 and resilient member 11 can be molded as a straight single body or provided separately. In this preferred embodiment, support 16 is a continuous rib molded as a single body with resilient member 11 and disposed between sensor holding portion 14 and inner bottom portion 17 of hollow portion 13 along a pressure sensing direction of piezoelectric sensor 10 (i.e., a horizontal direction in FIG. 1). Inner bottom portion 17 serves as a base member to sustain sensor holding portion 14 in position via support 16. A reference numeral 18 presents an outer bottom portion of resilient member 11. Outer bottom portion 18 is formed as a single body with resilient member 11 while maintaining predetermined gap 19 from inner bottom portion 17 of resilient member 11.

Figure 2:
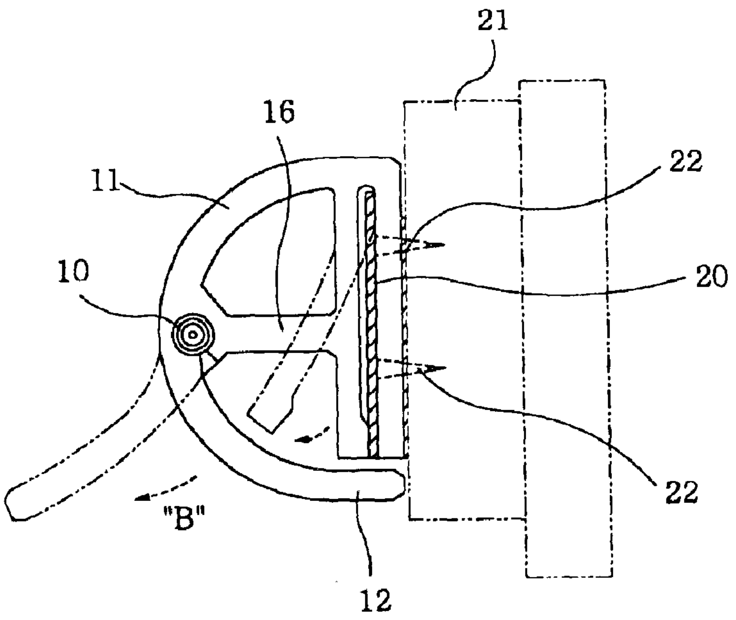
FIG. 2 provides a side view of the contact detecting device shown in FIG. 1 installed on a mounting base.

Referring to FIG. 2, there is shown a view for setting forth an installation process of the contact detecting device in accordance with the first preferred embodiment of the present invention. Preferably, piezoelectric sensor 10 is first set into sensor holding portion 14 by opening free end 12 in a direction of an arrow "B". Thereafter, resilient member 11 embracing piezoelectric sensor 10 is mounted on mounting base 21 by inserting mounting plate 20 into gap 19 and tightly fastening same to mounting base 21 with screws 22. At this time, it is preferable to have free end 12 placed at the bottom of resilient member 11. This facilitates the mounting process of resilient member 11 and it is rather difficult for undesired particulates or foreign substances to get into hollow portion 13 of resilient member 11.

Figure 4:
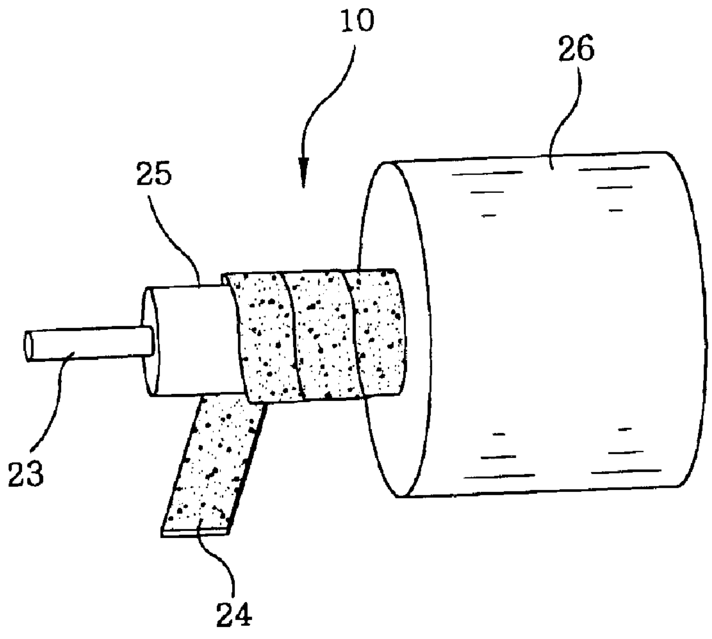
FIG. 4 presents a partial perspective view of a piezoelectric sensor included in the contact detecting device shown in FIG. 1.

Referring to FIG. 4, there is shown a construction of piezoelectric sensor 10. As shown, piezoelectric sensor 10 includes central electrode 23 serving as signal generating electrode, outer electrode 24, composite piezoelectric member 25 interposed between electrodes 23 and 24, and a coating layer 26. Further, piezoelectric sensor 10 has a cable shape with an outer diameter of about 2.5 mm. Composite piezoelectric member 25 is made of a substance obtained by mixing amorphous chlorinated polyethylene, crystalline chlorinated polyethylene and powder of piezoelectric ceramic.

Piezoelectric sensor 10 of the above-mentioned construction is of a high sensitivity, a long-term durability and a raised productive efficiency, and, when used together with resilient member 11 of the configuration described above, its own functionality can be fully carried out, enabling to perform a contact detection with high efficiency.

Figure 5:
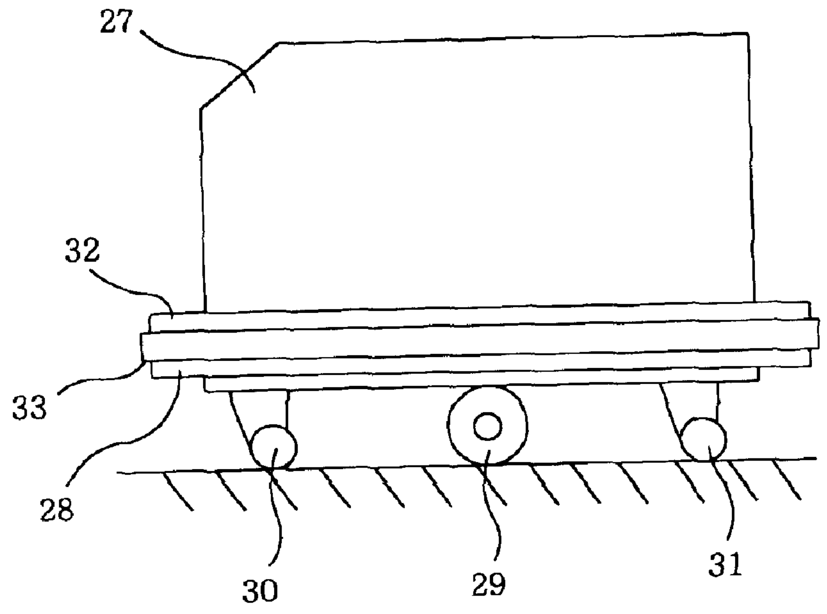
FIG. 5 represents a side view of a traveling apparatus equipped with the contact detecting device shown in FIG. 1.
Figure 6:
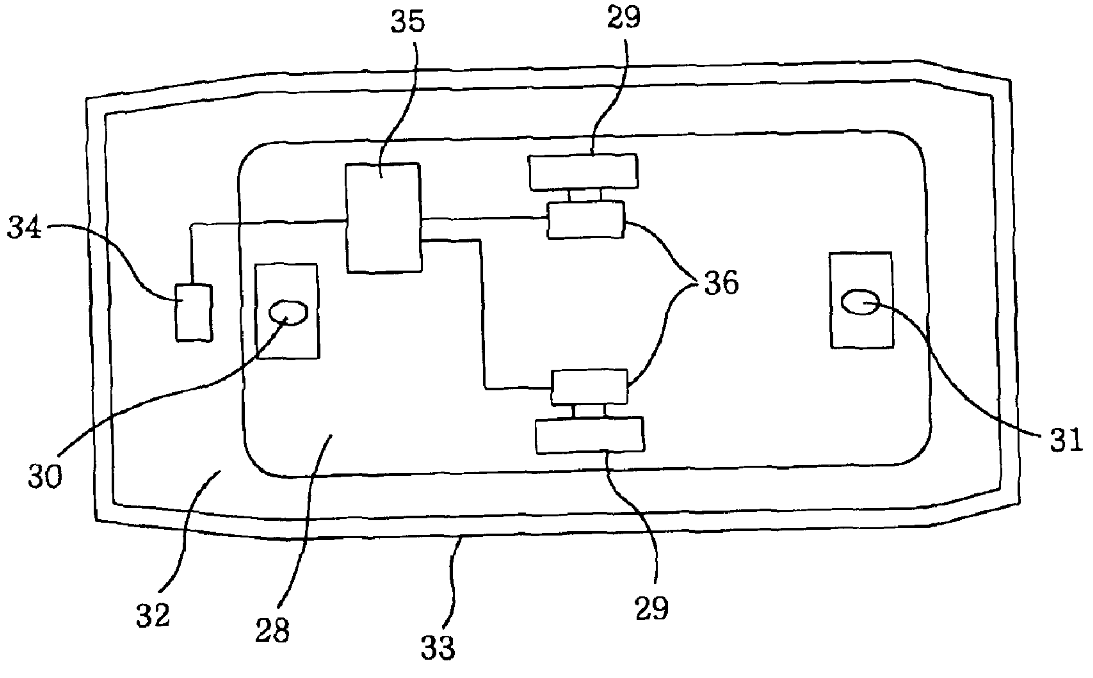
FIG. 6 describes a bottom view of the traveling apparatus shown in FIG. 5.

The contact detecting device in accordance with the first preferred embodiment of the invention can be used for various moving objects and mechanisms, e.g., a self-propelled vehicle, a power window of an automobile, an electric slide door, a power sunroof, an automatic door of a building or the like for the detection of contact with other objects in order to prevent, e.g., the human body from being injured and to thereby secure safe operation of the moving mechanisms; and as an example, the contact detecting device employed in a self-propelled vehicle will now be described with reference to FIGS. 5 and 6.

As shown, the self-propelled vehicle includes main body 27, truck 28, a pair of driving wheels 29, a pair of front following wheels 30, a pair of rear following wheels 31, bumper 32, sensor unit 33 equipped with resilient member 11 having piezoelectric sensor 10, contact determination unit 34, and controller 35. Such a self-propelled vehicle can be used as an unmanned vehicle for transporting certain objects. Bumper 32 is disposed around the periphery of truck 28 and sensor unit 33 is installed at one or more specific locations or an entire peripheral surface of bumper 32. Driving wheels 29 are driven by motor 36.

When an obstacle comes into contact with sensor unit 33 during the operation of the vehicle, piezoelectric sensor 10 in sensor unit 33 is deformed to generate a signal varying in accordance with the acceleration of deformation, owing to the piezoelectric effect. At this time, since piezoelectric sensor 10 is held by resilient member 11, they can deform together, loading an increased amount of deformation in piezoelectric sensor 10. For this reason, the acceleration corresponding to a second-order differentiation of the deformation becomes greater as well, which in turn results in an augmented output signal of piezoelectric sensor 10. Therefore, it is possible to obtain the contact detecting device of a high sensitivity. In addition, the configuration of the vehicle can be simpler in case the contact detecting device is made to serve as the bumper 32 as well.

In case of maintenance, piezoelectric sensor 10 can be easily removed from resilient member 11 by way of opening free end 12. In case of normal operation of the contact detecting device not requiring the maintenance service, hollow portion 13 can be kept from foreign substances by way of closing free end 12 by an adhesion for example.

In case of using the contact detecting device of the first preferred embodiment, even when sensor unit 33 is installed to a curved surface such as a corner, hollow portion 13 of resilient member 11 maintains its hollow state by means of support 16 (i.e., the original shape of hollow portion can be maintained due to support 16), so that piezoelectric sensor 10 can be properly operated to perform contact detection without malfunctioning. That is, support 16 serves to prevent or constrain the reduction in the distance between sensor holding portion 14 and inner bottom portion 17.

(Embodiment 2)

Figure 7:
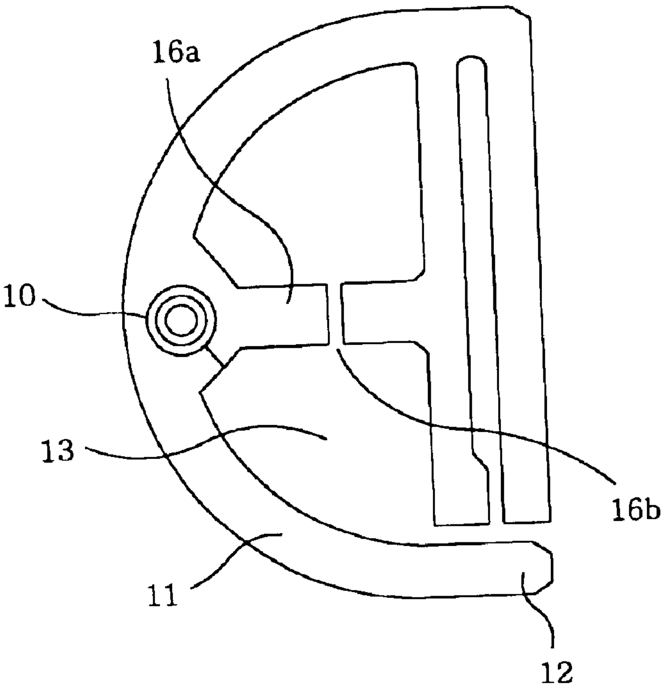
FIG. 7 depicts a side view of a contact detecting device in accordance with a second preferred embodiment of the present invention.

Referring to FIG. 7, there is illustrated a contact detecting device in accordance with a second preferred embodiment of the present invention.

The device of the second preferred embodiment is identical to that of the first embodiment, excepting a structure of support **16*a***.

As shown, support **16*a* functioning to maintain a hollow state of hollow portion 13 has a rib structure divided into two portions by gap 16*b* provided therebetween. Support 16*a*** does not reduce or degrade the deformation (i.e., detection performance) of piezoelectric sensor 10 and maintains the hollow state of hollow portion 13 when the device is arranged in a curved shape. That is to say, gap 16*b* serves to facilitate the bending of free end 12 while hollow portion 13 can preserve its original shape (i.e., a hollow state) by the back-to-back support of the two divided portions of support 16*a*.

(Embodiment 3)

Figure 8:
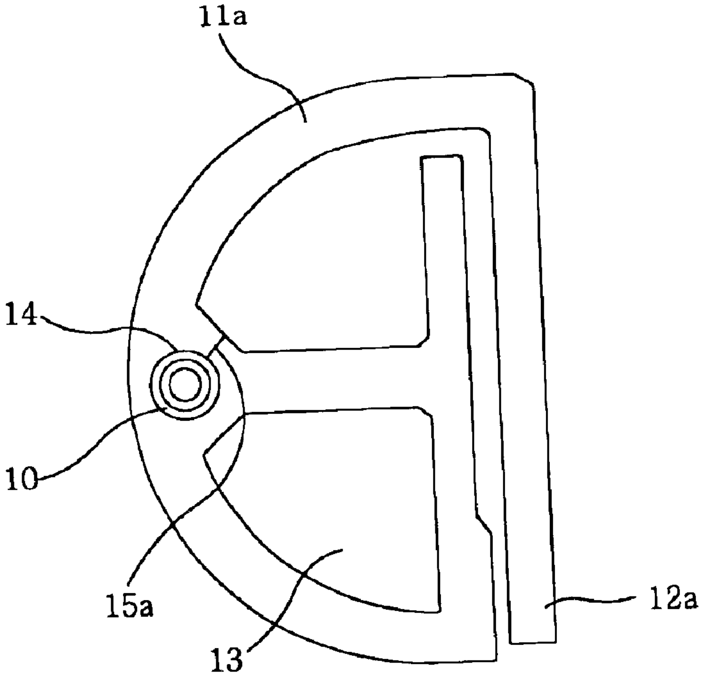
FIG. 8 discloses a side view of a contact detecting device in accordance with a third preferred embodiment of the present invention.

Referring to FIG. 8, there is illustrated a contact detecting device in accordance with a third embodiment of the present invention. Since the structure and operational principle of the device of the third embodiment are same as those of the first embodiment, only differences therebetween will be described.

As shown, opening direction of resilient member 11a (i.e., a position of linear free end 12*a*) and a direction of cut region 15*a* are opposite to those in the first embodiment. More specifically, when viewed from FIG. 8, cut region 15*a* extends from sensor holding portion 14 in an upward and rightward oblique direction and linear free end 12*a* extends from a round region of resilient member 11*a* in a downward direction.

In this configuration, piezoelectric sensor 10 can be held by resilient member 11*a* more firmly, so that piezoelectric sensor 10 can be prevented from being released from sensor holding portion 14 during the use thereof.

(Embodiment 4)

Figure 9:
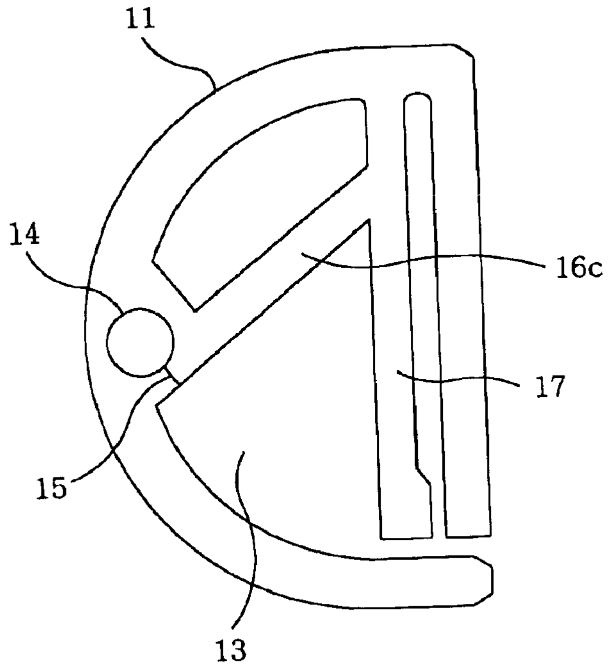
FIG. 9 offers a side view of a contact detecting device in accordance with a fourth preferred embodiment of the present invention.

Referring to FIG. 9, there is shown a contact detecting device in accordance with a fourth embodiment of the present invention. Since the structure and operational principle of the device of this embodiment are generally identical to those of the first embodiment, only differences therebetween will be described.

As shown, support 16*c* is disposed between sensor holding portion 14 and inner bottom portion 17 in such a manner as to be inclined to a pressure sensing direction (i.e., a horizontal direction in FIG. 9).

This offers advantages similar to those of the second preferred embodiment. The rib serves to maintain the hollow state of hollow portion 13 without deteriorating the deformation (detection performance) of piezoelectric sensor 10, so that the contact detection can be properly accomplished.

The support 16*c* can be a continuous rib having a straight single body as shown in FIG. 9 but can be of a divided rib structure as in the second embodiment.

(Embodiment 5)

Figure 10:
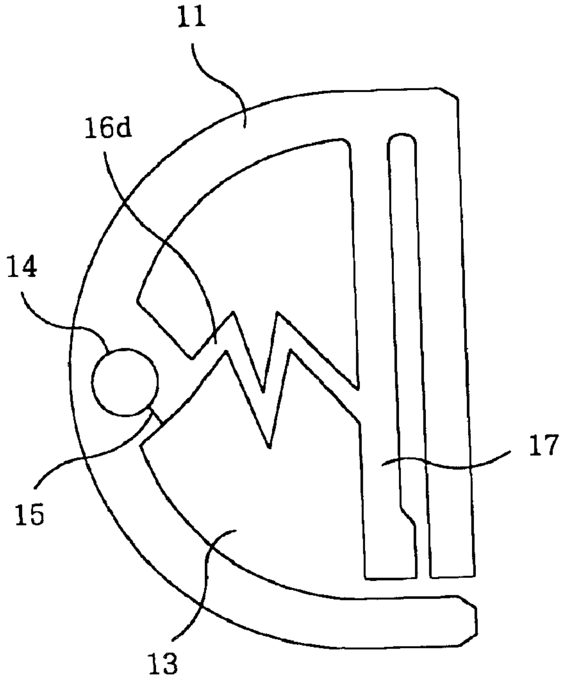
FIG. 10 provides a side view of a contact detecting device in accordance with a fifth preferred embodiment of the present invention.

Referring to FIG. 10, there is shown a side view of a contact detecting device in accordance with a fifth embodiment of the present invention.

The device of the fifth preferred embodiment is similar to the device of the first embodiment excepting the shape of support 16*d*.

As shown, support 16*d* is a rib of a zigzagged single body located between sensor holding portion 14 and inner bottom portion 17. This offers advantages similar to those of the second and the fourth preferred embodiment. The rib serves to maintain hollow state of hollow portion 13 without deteriorating the deformation (detection performance) of piezoelectric sensor 10, so that the contact detection can be properly accomplished.

Support 16*d* may be a rib of a zigzag body but of a divided structure as in the second embodiment.

(Embodiment 6)

Figure 11:
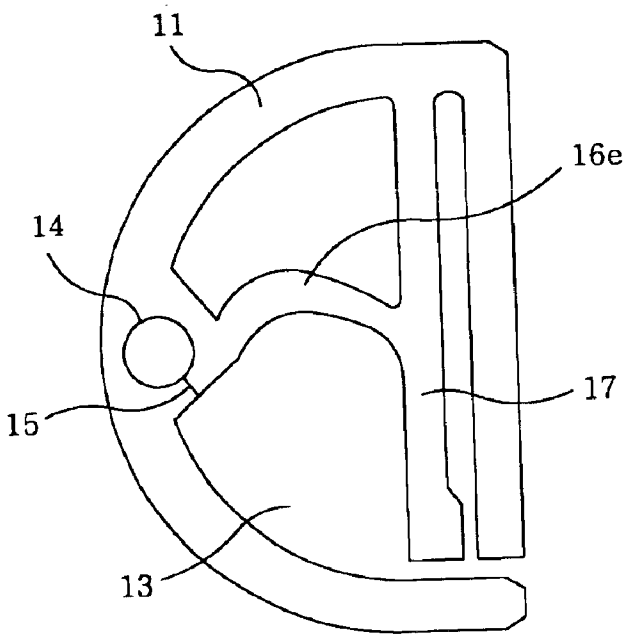
FIG. 11 depicts a side view of a contact detecting device in accordance with a sixth preferred embodiment of the present invention.

Referring to FIG. 11, there is shown a contact detecting device in accordance with a sixth embodiment of the present invention.

The device of the sixth preferred embodiment is similar to the device of the first embodiment, excepting the shape of support 16*e*.

As shown, support 16*e* is a rib of a curved single body disposed between sensor holding portion 14 and inner bottom portion 17. This offers advantages similar to those of the second, the fourth and the fifth preferred embodiment. The rib serves to maintain a hollow state of hollow portion 13 without deteriorating the deformation (detection performance) of piezoelectric sensor 10, so that the contact detection can be properly accomplished.

Support 16*e* may be a rib of a curved single body but of a divided structure as in the second embodiment.

(Embodiment 7)

Figure 12:
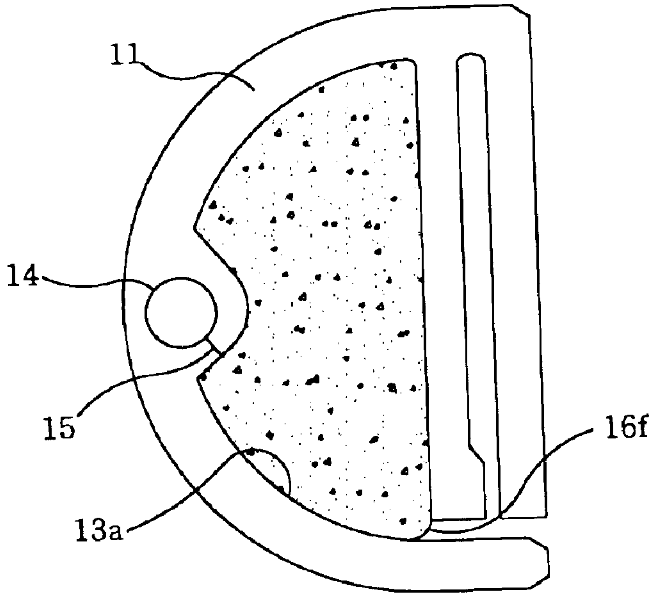
FIG. 12 displays a side view of a contact detecting device in accordance with a seventh preferred embodiment of the present invention.

Referring to FIG. 12, there is shown a contact detecting device in accordance with a seventh embodiment of the present invention.

The device of the seventh preferred embodiment is similar to the device of the first embodiment, excepting support 16*f* employed in lieu of support 16.

As shown, support 16*f* is an elastic body such as a spongy material filled in hollow portion 13*a*. The elastic body is separated from resilient member 11 and is filled thereinto by opening hollow portion 13*a*. This offers advantages similar to those of the second, the fourth, the fifth and the sixth preferred embodiment. The elastic body serves to maintain the shape of the hollow portion 13*a* without deteriorating the deformation (detection performance) of piezoelectric sensor 10, so that the contact detection can be properly accomplished.

(Embodiment 8)

Figure 13:
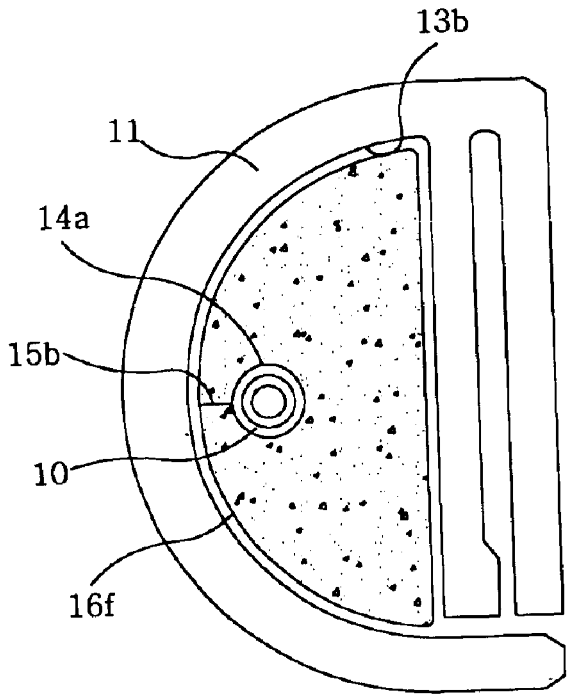
FIG. 13 demonstrates a side view of a contact detecting device in accordance with an eighth preferred embodiment of the present invention.

Referring to FIG. 13, there is shown a contact detecting device in accordance with an eighth embodiment of the present invention.

The device of the eighth preferred embodiment is similar to the device of the seventh embodiment, excepting locations of sensor holding portion 14*a* and cut region 15*b*.

As shown, sensor holding portion 14*a* is not provided in resilient member 11 but is provided in support 16*f* and cut region 15*b* extends therefrom to the periphery of support 16*f*. In such a construction, support 16*f* having piezoelectric sensor 10 previously mounted therein is inserted into hollow portion 13*b*.

This offers advantages similar to those of the second, the fourth, and the fifth to the seventh preferred embodiment.

When the eighth embodiment device is employed in the self-propelled vehicle as shown in FIG. 5, it is possible to minimize vibration to be transmitted to piezoelectric sensor 10. More specifically, even when the self-propelled vehicle runs on an uneven or stepped surface, the vibration is damped by elastic support 16*f*, reducing the vibration to be transferred to piezoelectric sensor 10 built therein. As a result, it is possible for piezoelectric sensor 10 to perform the stable contact detection without malfunctioning.

(Embodiment 9)

Figure 14:
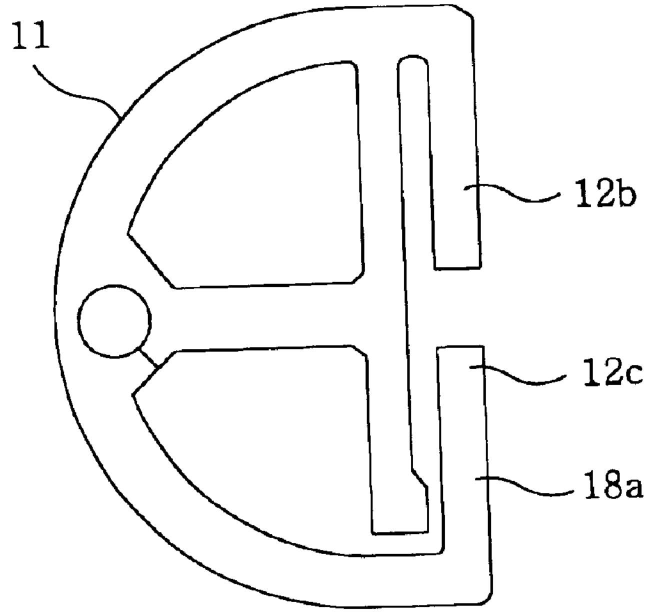
FIG. 14 exemplifies a side view of a contact detecting device in accordance with a ninth preferred embodiment of the present invention.

Referring to FIG. 14, there is shown a contact detecting device in accordance with a ninth embodiment of the present invention.

The device of the ninth preferred embodiment is similar to the device of the first embodiment, excepting a construction of outer bottom portion 18*a*.

As shown, outer bottom portion 18*a* is divided into two parts 12*b* and 12*c* at, e.g., a middle portion thereof, one part 12*c* serving as a free end. In other words, outer bottom portion 18 of the first embodiment is reduced in size and free end 12 thereof is extended toward the reduced outer bottom portion, so that extended free end 12*c* also serving as a part of outer bottom portion 18*a*. Resilient member 11 is mounted on mounting base 21 (see FIG. 2) by, e.g., both of linear end 12*b* and free end 12*c*. Therefore, the inner space of resilient member 11 can be isolated from the outside by way of mounting resilient member 11 to mounting base 21, without requiring any additional process.

(Embodiment 10)

Figure 15:
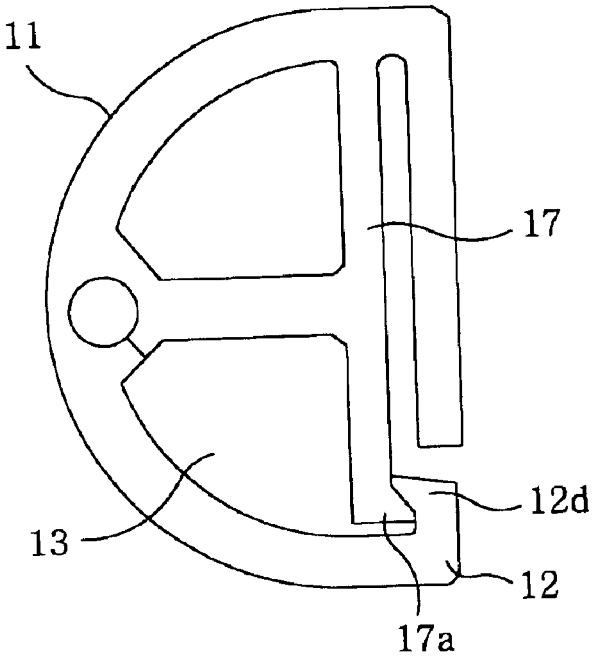
FIG. 15 exhibits a side view of a contact detecting device in accordance with a tenth preferred embodiment of the present invention.

Referring to FIG. 15, there is shown a contact detecting device in accordance with a tenth embodiment of the present invention.

The device of the tenth preferred embodiment is similar to the device of the first embodiment, excepting a pair of first and second engagement member 12*d* and 17*a*.

As shown, first and the second engagement member 12*d* and 17*a* are respectively formed at free end 12 and a free end of inner bottom portion 17. By detachably coupling engagement members 12*d*, 17*a* to each other after inserting piezoelectric sensor 10 into resilient member 11, hollow portion 13 of resilient member 11 is closed, preventing undesired particulates or foreign substances from entering into hollow portion 13 of resilient member 11 without requiring any special treatment or process.

(Embodiment 11)

Figure 16:
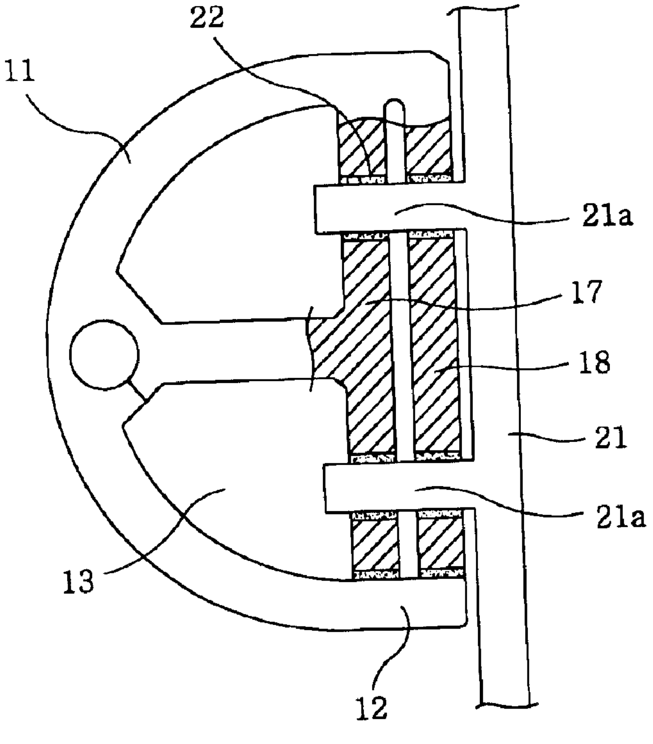
FIG. 16 reveals a partial cutaway cross sectional side view of a contact detecting device in accordance with an eleventh preferred embodiment of the present invention.
Figure 17:
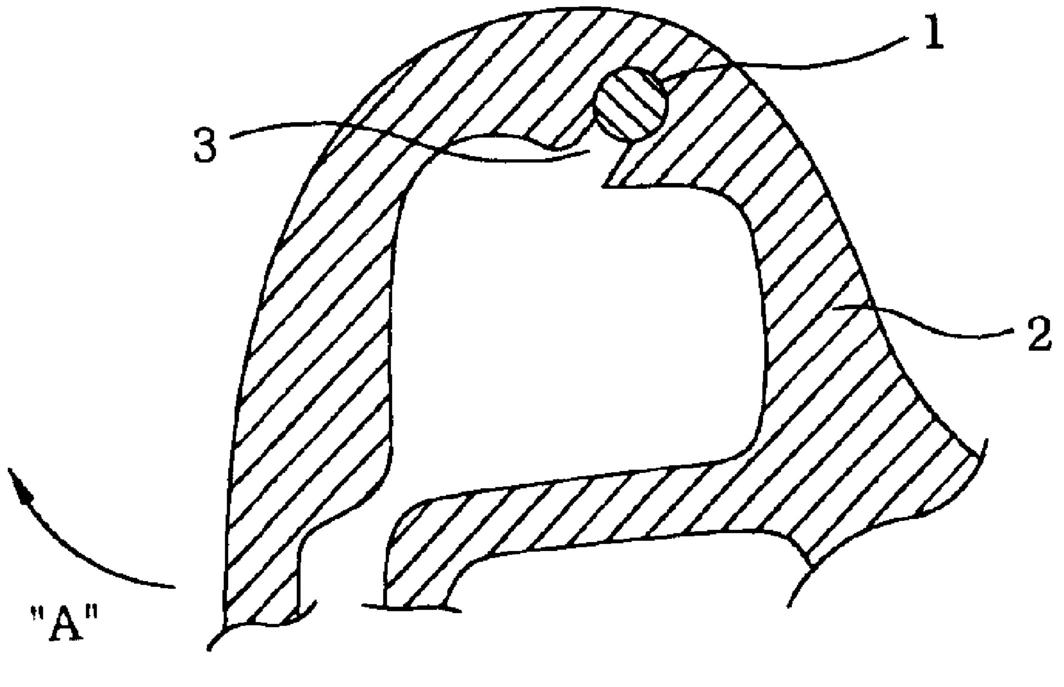
FIG. 17 (PRIOR ART)
FIG. 17 explains a transversal cross sectional view of a prior art contact detecting device.

Referring to FIG. 16, there is shown a contact detecting device in accordance with an eleventh embodiment of the present invention.

The device of the eleventh preferred embodiment is similar to the device of the first embodiment, excepting a construction of bottom portions 17, 18 and mounting base 21.

As shown, mounting base 21 has pins 21*a* protruding therefrom and bottom portions 17, 18 are respectively provided with openings for accommodating pins 21*a*. Resilient member 11 is fixed at mounting base 21 by applying an adhesive 22 between pins 21*a* and the openings of bottom portions 17, 18. Further, bottom portions 17, 18 and free end 12 are attached to each other by using the adhesive 22 to close hollow portion 13.

Although the above preferred embodiments of the present invention have been described with respect to the contact detecting device having a semi-circular cross section, its cross sectional shape in a section is not restricted to the semi-circular shape but may be a rectangle, a triangle or the like depending on application and/or mounting location thereof.

While the invention has been shown and described with respect to the preferred embodiments, it will be understood by those skilled in the art that various changes and modifications may be made without departing from the spirit and scope of the invention as defined in the following claims.

What is claimed is:

1. A contact detecting device comprising:

a flexible piezoelectric sensor of a cable shape; and a resilient member for holding the piezoelectric sensor therein, the resilient member including a hollow portion, which has a free end to allow the hollow portion to be opened, and a sensor holding portion for mounting therein the piezoelectric sensor by way of opening the hollow portion, wherein the hollow portion is provided with a support for maintaining a hollow state thereof, and the support is provided between the sensor holding portion and an inner base member of the hollow portion.

2. The contact detecting device of claim 1, wherein the support has a straight rib shape formed as a single body with the resilient member and is provided along a pressure sensing direction of the piezoelectric sensor.

3. The contact detecting device of claim 1, wherein the support has a straight rib shape formed as a single body with the resilient member and is provided to be inclined to a pressure sensing direction of the piezoelectric sensor.

4. The contact detecting device of claim 1, wherein the support is a rib having a zigzagged shape formed as a single body with the resilient member.

5. The contact detecting device of claim 1, wherein the support is a rib of a curved shape formed as a single body with the resilient member.

6. The contact detecting device of any one of claims 2 to 5, wherein the support is formed of divided parts.

7. The contact detecting device of claim 1, wherein the support is an elastic body filled in the hollow portion.

8. A contact detecting device comprising:

a flexible piezoelectric sensor of a cable shape;

a resilient member for holding the piezoelectric sensor, the resilient member including a hollow portion having a free end to allow the hollow portion to be opened;

a support for maintaining a hollow state of the hollow portion, the support being formed of an elastic body and filled in the hollow portion; and a sensor holding portion, provided in the support, for mounting therein the piezoelectric sensor.

9. The contact detecting device of claim 1 or 8, wherein the resilient member is mounted to a mounting base such that the free end is located at a bottom part of the resilient member.

10. The contact detecting device of claim 1 or 8, wherein the free end is attached to a part of the resilient member by using an adhesive while the piezoelectric sensor is held in the sensor holding portion.

11. The contact detecting device of claim 1 or 8, further comprising a coupling means for allowing the free end to be attached to and detached from a part of the resilient member while the piezoelectric sensor is held in the sensor holding portion.

12. The contact detecting device of claim 1 or 8, wherein the free end is a part of a mounting member that is fixed on a mounting base when mounting the resilient member thereon.

13. The contact detecting device of claim 10, wherein the resilient member is mounted on a mounting base by using an adhesive material.

14. The contact detecting device of claim 1 or 8, wherein the piezoelectric sensor is made of a composite piezoelectric substance obtained by mixing amorphous chlorinated polyethylene, crystalline chlorinated polyethylene and powder of piezoelectric ceramic.

15. An apparatus comprising the contact detecting device of claim 1 or 8.

16. The apparatus of claim 15, wherein the apparatus is a self-propelled vehicle, a power window for an automobile, an electric slide door, a power sunroof or an automatic door of a building.

* * * * *